May 30, 1961  N. S. COONROD  2,986,389
LEAF-SPRING MOUNTING BRACKET
Filed Feb. 3, 1958

INVENTOR.
N. S. COONROD

United States Patent Office 2,986,389
Patented May 30, 1961

2,986,389
LEAF-SPRING MOUNTING BRACKET
Noble S. Coonrod, 2316 Market Ave., Fort Worth, Tex.

Filed Feb. 3, 1958, Ser. No. 712,948

2 Claims. (Cl. 267—56)

This invention discloses an improved leaf-spring mounting bracket for use on vehicles such as trailers, trucks and cars; and, more particularly, discloses a mounting bracket which increases the effectiveness of a standard leaf-spring to thereby improve the riding characteristics of the vehicle on which it is used.

It is an object of this invention to improve the riding characteristics of vehicles using leaf-springs of the type widely known in the automotive industry.

It is a further object of this invention to increase the useful life of automotive leaf-springs.

Other objects and features of my invention will become evident upon examination of the following description, taken in conjunction with the accompanying single sheet of drawings, in which.

Figure 1:
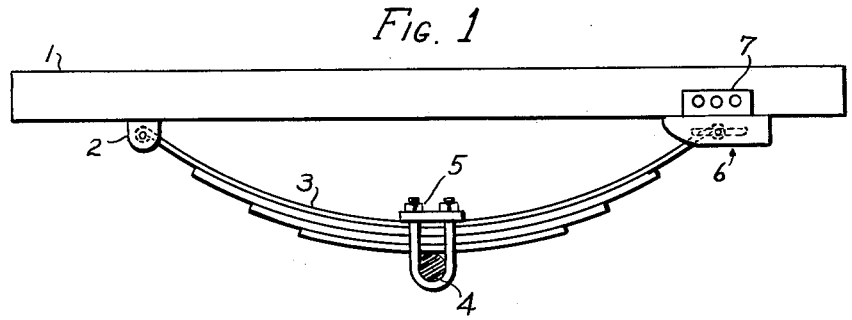
Figure 1 shows a typical use of my invention, with the bracket mounted at the end of an ordinary leaf-spring.

In Fig. 1, the vehicle frame 1 is shown with a typical pin type mounting bracket 2 supporting one end of leaf-spring 3. I have found that bracket 2, which is the type widely used in the industry, should be mounted at the forward end of the spring in order for my bracket 6 to provide maximum effectiveness. The U bolt 5 is shown mounted in the usual position, supporting axle 4 which is shown in cross section. One such spring assembly is, of course, mounted on each side of the vehicle, as is the usual practice.

Figure 2:
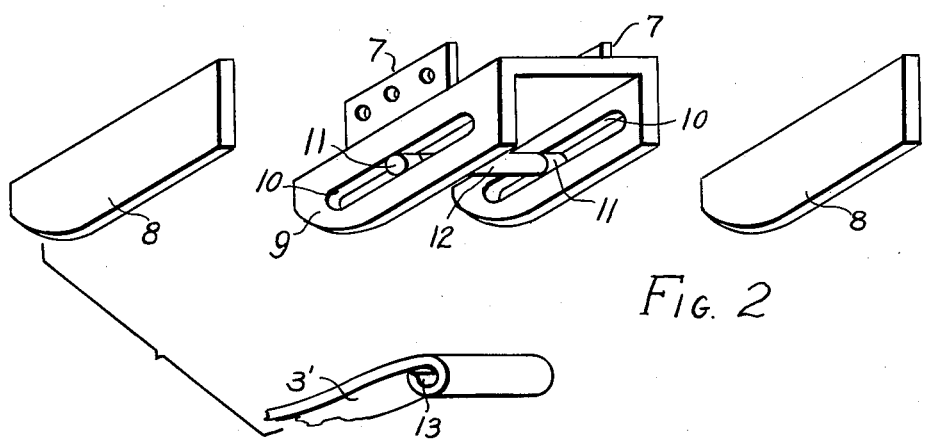
Figure 2 is an enlarged and exploded view of my mounting bracket.
Figure 3:
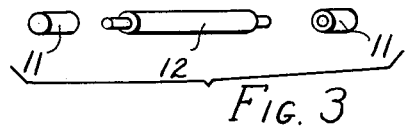
Figure 3 is an exploded view of the bearing pin.

Referring now to Fig. 2, wherein bracket 6 is shown in an exploded view, I will now explain the details of my new mounting bracket. The supporting frame 9 of my bracket, is shown in a bottom perspective view, and is mounted to the vehicle frame by means of bracket 7. This frame is formed from a steel channel section, and shaped as shown, with an elongated opening 10 along each side. Pin assembly 11—12, which consists of two roller bearings 11 and a pin 12 (see Fig. 3), is shown mounted in openings 10. Pin 12 is formed with a cylindrical body portion, and axially extending end portions having a smaller diameter than said body portion, as shown. The main leaf of spring 3 is formed into a loop at each end, so as to form opening 13, in the usual manner. The diameter of pin 12 is such that the pin fits into opening 13, and the inside channel width of supporting frame 9 is such that the main leaf will slip into the opening without binding. Cover plates 8 are mounted along each side of supporting frame 9, in any suitable manner. Plates 8 serve to hold pin assembly 11—12 in position, to help retain a lubricant in contact with roller bearings 11, and to keep dust and dirt away from said bearings. It should be noted that the bottom and rear openings in the supporting frame, as well as part of the front opening, could also be covered in any suitable manner, to aid in keeping dirt away from the bearings.

With the bracket assembled in the manner above described, and the vehicle normally loaded, the bearings 11 are preferably located at the approximate center of openings 10. Then, as the vehicle moves, the pin will move back and forth in said openings 10. It should be noted that the bracket on one side of the vehicle will absorb shock or, a shift in load caused by a turn, without disturbing the bracket located at the opposite side of the vehicle, and with a substantial minimizing of the "bouncing" effect normally characteristic of the usual leaf-spring assembly.

What has been described is considered to be the preferred embodiment of my invention, but it should be understood that modifications may be made without departing from the scope thereof as defined in the appended claims.

What I claim is:

1. A leaf spring bracket assembly mounted on the frame of a vehicle consisting of: a supporting frame securely attached to said vehicle and having the form of a U-shaped channel section with an elongated opening along each side thereof; a pin mounted through the opening at the end of the main leaf of said leaf-spring and across said supporting frame; a pair of roller bearings having the form of cylindrical sleeves closed at one end, said bearings rotatably mounted at opposite ends of said pin and located thereby in said elongated openings; and a pair of cover plates mounted on opposite sides of said supporting frame, said cover plates effective to hold said bearings in rotational engagement with said pin and said openings.

2. A leaf spring bracket assembly mounted on the frame of a vehicle comprising: a base section in the form of a U-shaped channel having an elongated opening along each side, said channel having an inside width slightly larger than the width of the main leaf of said leaf-spring; a supporting pin formed with a body portion of approximately the same length as said main leaf width and a diameter such that said body portion fits snugly into the opening at the end of said main leaf, and an end portion extending longitudinally from the center of each end of said body portion, said end portions having smaller diameter than said body portion diameter; a pair of cup-shaped roller bearings having the form of cylindrical sleeves closed at one end and having an inside diameter slightly larger than the diameter of said end portions, and an outside diameter slightly smaller than the width of said elongated openings, said bearings being rotatably mounted on each of said end portions of said pin and positioned in said elongated openings at opposite sides of said base section; means for mounting said base section to the underside of said vehicle frame with the length of said channel oriented along the length of said leaf-spring and said pin located transversely to said length, said bearings thereby positioned at the approximate center of said elongated openings so as to move back and forth in said openings in accordance with the vibration of said leaf-spring; and a pair of cover plates mounted on the outer surfaces of the two sides of said base section so as to cover said elongated openings and hold said bearings on said pin.

References Cited in the file of this patent

UNITED STATES PATENTS

| 1,013,547 | Gramm | Jan. 2, 1912 |
| 1,327,063 | Rigby | Jan. 6, 1920 |
| 1,580,540 | Shay | Apr. 13, 1926 |
| 1,877,734 | Searles | Sept. 13, 1932 |

FOREIGN PATENTS

| 464,339 | France | Jan. 10, 1914 |
| 279,773 | Italy | Nov. 21, 1930 |